US012614435B2

(12) United States Patent
Zhu et al.

(10) Patent No.: US 12,614,435 B2
(45) Date of Patent: Apr. 28, 2026

(54) ROPE-TYPE ANTI-THEFT DEVICE AND ALARM ELIMINATION METHOD THEREOF

(71) Applicant: HANGZHOU CENTURY CO., LTD, Hangzhou (CN)

(72) Inventors: Lide Zhu, Hangzhou (CN); Zhigang Li, Hangzhou (CN); Xianqiang Guo, Hangzhou (CN)

(73) Assignee: HANGZHOU CENTURY CO., LTD, Hangzhou (CN)

( * ) Notice: Subject to any disclaimer, the term of this patent is extended or adjusted under 35 U.S.C. 154(b) by 0 days.

(21) Appl. No.: 18/832,096

(22) PCT Filed: May 4, 2023

(86) PCT No.: PCT/CN2023/091953
§ 371 (c)(1),
(2) Date: Jul. 22, 2024

(87) PCT Pub. No.: WO2024/016784
PCT Pub. Date: Jan. 25, 2024

(65) Prior Publication Data

US 2025/0148888 A1 May 8, 2025

(30) Foreign Application Priority Data

Jul. 20, 2022 (CN) ......................... 202210872348.4

(51) Int. Cl.
*G08B 13/24* (2006.01)
*G08B 13/14* (2006.01)

(52) U.S. Cl.
CPC ....... *G08B 13/1454* (2013.01); *G08B 13/149* (2013.01); *G08B 13/2431* (2013.01)

(58) Field of Classification Search
CPC .............. G08B 13/1454; G08B 13/149; G08B 13/2431; G08B 13/2434; G08B 13/2448; G08B 13/1445
See application file for complete search history.

(56) References Cited

U.S. PATENT DOCUMENTS 5,959,532 A * 9/1999 Fujiuchi ............. G08B 13/1454 340/572.1
8,917,180 B2 * 12/2014 Sayegh ............... E05B 73/0029 70/57.1

(Continued)

FOREIGN PATENT DOCUMENTS

CN 104916225 A 9/2015
CN 209560670 U 10/2019

(Continued)

*Primary Examiner* — Nay Tun
(74) *Attorney, Agent, or Firm* — Bayramoglu Law Offices LLC

(57) ABSTRACT

A rope-type anti-theft device and an alarm elimination method thereof are provided. The rope-type anti-theft device includes a device body, and a control module, a logic switch module and a power module are provided in the device body. The power module is configured to supply power to the control module. The logic switch module includes a second logic level switch circuit. The second logic level switch circuit is electrically connected to a second input port of a chip in the control module, and the second logic level switch circuit is provided with a second switch. When the second switch is in a connected state, the second input port is at a low level. When the second switch is in a disconnected state, the second input port is at a high level. The second switch is connected or disconnected by an anti-theft rope in the device body.

8 Claims, 3 Drawing Sheets

(56) References Cited

U.S. PATENT DOCUMENTS

| | | | | |
|---|---|---|---|---|
| 2004/0207525 | A1* | 10/2004 | Wholey | G08B 13/126 340/568.2 |
| 2012/0304710 | A1* | 12/2012 | Sayegh | E05B 73/0029 70/14 |
| 2017/0193777 | A1* | 7/2017 | Sayegh | G08B 13/2465 |

FOREIGN PATENT DOCUMENTS

| | | | |
|---|---|---|---|
| CN | 209842810 | U | 12/2019 |
| CN | 218676185 | U | 3/2023 |
| CN | 115909624 | A | 4/2023 |
| JP | 2001052266 | A | 2/2001 |
| JP | 2004094415 | A | 3/2004 |

* cited by examiner

ROPE-TYPE ANTI-THEFT DEVICE AND ALARM ELIMINATION METHOD THEREOF

CROSS REFERENCE TO THE RELATED APPLICATIONS

This application is the national phase entry of International Application No. PCT/CN2023/091953, filed on May 4, 2023, which is based upon and claims priority to Chinese Patent Application No. 202210872348.4, filed on Jul. 20, 2022, the entire contents of which are incorporated herein by reference.

TECHNICAL FIELD

The present disclosure belongs to the technical field of electronic article surveillance (EAS), and in particular relates to a rope-type anti-theft device and an alarm elimination method thereof.

BACKGROUND

The electronic article surveillance (EAS) system is one of the widely used product security measures in the large-scale retail industry. Emerging in the mid-1960s in the United States, the EAS system was originally applied to the clothing industry, and has now expanded to most countries and regions around the world and applied to various fields such as department stores, supermarkets, and books. The EAS system mainly includes three parts: a detector, a decoder (unlocking device), and an electronic tag. There are two types of electronic tags, namely soft and hard tags. Soft tags are disposable, low-cost, and deactivated by the decoder. Hard tags are reusable and unlocked by a specialized unlocking device. At present, there are various hard tags on the market, among which rope-type electronic hard tags (i.e. rope-type anti-theft devices) are widely used.

Chinese Patent Application CN104916225A proposes a replaceable rope-type tag, which is a single-rope anti-theft device. Chinese Patent Application CN209560670U proposes an anti-theft tag with an automatic wire winding device, which is a double-rope anti-theft device. The single-rope and double-rope electronic hard tags enter the working state only when the power switch (unlocking switch) is connected and the anti-theft rope is in the locked state. If the anti-theft rope is cut off or the internal core of the anti-theft rope is broken, the tag will sound an alarm or/and light, and to eliminate the alarm, the power switch must be disconnected. FIG. 1 shows a circuit diagram of an existing rope-type anti-theft device. When the power switch (the first switch) in the battery power supply circuit is connected and the anti-theft rope is locked (the second switch is connected), the P64 port of the microcontroller unit (MCU) chip is at a low level, and the device enters a protection state. In the protection state, if the anti-theft rope of the anti-theft device is disconnected, the P64 port switches from the low level to a high level, and the MCU chip controls the anti-theft device to alarm. However, when the existing rope-type anti-theft device is in the unlocked state (the power switch is disconnected), if the anti-theft rope is cut off or the internal core of the anti-theft rope is broken, the anti-theft device will not alarm. In this case, the existing anti-theft device cannot monitor the state of the anti-theft rope, and thus cannot detect any adverse situation in a timely manner, nor determine whether the anti-theft rope is broken before it is affixed to an article.

In addition, to eliminate the alarm, a staff member needs to disconnect the first switch (the power switch). When the first switch is disconnected, the anti-theft device stops alarming.

SUMMARY

Design Objective: In response to the shortcomings mentioned in the Background section, the present disclosure designs a rope-type anti-theft device and an alarm elimination method thereof. In the present disclosure, the rope-type anti-theft device provides real-time protection for an article when the device is in a locked state and detects any adverse situation in an anti-theft rope in a timely manner when the device is in an unlocked state. Besides, the rope-type anti-theft device is easy for a staff member to eliminate an alarm.

Design Solution: The present disclosure aims to achieve the above design objectives.

1. A logic switch module includes a second logic level switch circuit; the second logic level switch circuit is electrically connected to a second input port of a chip in a control module; the second logic level switch circuit is provided with a second switch; when the second switch is in a connected state, the second input port is at a low level; when the second switch is in a disconnected state, the second input port is at a high level; and the second switch is connected or disconnected by an anti-theft rope in the device body. This is a first technical feature of the present disclosure. An objective of the design "a logic switch module includes a second logic level switch circuit; the second logic level switch circuit is electrically connected to a second input port of a chip in a control module; the second logic level switch circuit is provided with a second switch; when the second switch is in a connected state, the second input port is at a low level; when the second switch is in a disconnected state, the second input port is at a high level; and the second switch is connected or disconnected by an anti-theft rope in the device body" is as follows. When the rope-type anti-theft device is powered on (the battery begins to supply power to the device), whether the rope-type anti-theft device is in the unlocked or locked state, it can detect the continuity of the anti-theft rope. The rope-type anti-theft device can provide real-time protection for the article when the device is in the locked state, and can detect any adverse situation in the rope-type anti-theft device in a timely manner when the device is in the unlocked state.
2. The logic switch module further includes a first logic level switch circuit; the first logic level switch circuit is electrically connected to a first input port of the chip in the control module, and the first logic level switch circuit is provided with a first switch; when the first switch is in a connected state, the first input port is at a low level; when the first switch is in a disconnected state, the first input port is at a high level; and the first switch is connected or disconnected by a button located on a housing of the device body. This is a second technical feature of the present disclosure. An objective of the design "the logic switch module further includes a first logic level switch circuit; the first logic level switch circuit is electrically connected to a first input port of the chip in the control module, and the first logic level switch circuit is provided with a first switch; when the first switch is in a connected state, the first input port is at a low level; when the first switch is in a disconnected state, the first input port is at a high level;

and the first switch is connected or disconnected by a button located on a housing of the device body" is as follows. When the rope-type anti-theft device is in an unlocked state and alarms due to cut-off of an anti-theft rope or breakage of a core of the anti-theft rope, the following operations are performed: disconnecting, by a button, a first switch if the first switch remains a connected state, such that the rope-type anti-theft device stops alarming; and connecting, by the button, the first switch if the first switch remains the disconnected state, such that the rope-type anti-theft device stops alarming. When the rope-type anti-theft device is in a locked state and alarms due to cut-off of the anti-theft rope or breakage of the core of the anti-theft rope, the following operations are performed: disconnecting, by the button, the first switch if the first switch remains the connected state, such that the rope-type anti-theft device stops alarming; and connecting, by the button, the first switch if the first switch remains the disconnected state, such that the rope-type anti-theft device stops alarming. In other words, whether the rope-type anti-theft device is in the unlocked or locked state, if an alarm is triggered when the device detects the discontinuity (cut-off or core breakage) of the anti-theft rope, the user can eliminate the alarm quickly and conveniently by switching the high and low levels of the P65 port.

3. One terminal of a first resistor in the first logic level switch circuit is electrically connected to a power supply terminal through a wire, and the other terminal of the first resistor is electrically connected to the first input port through a wire; the other terminal of the first resistor electrically connected to the first input port is electrically connected to one terminal of the first switch through a wire; and the other terminal of the first switch is grounded. This is a third technical feature of the present disclosure. An objective of the design "one terminal of a first resistor in the first logic level switch circuit is electrically connected to a power supply terminal through a wire, and the other terminal of the first resistor is electrically connected to the first input port through a wire; the other terminal of the first resistor electrically connected to the first input port is electrically connected to one terminal of the first switch through a wire; and the other terminal of the first switch is grounded" is as follows. The first logic level switch circuit is safe and reliable to use, has low production cost, and can reduce battery consumption (extend the battery life).
4. One terminal of a second resistor in the second logic level switch circuit is electrically connected to a power supply terminal through a wire, and the other terminal of the second resistor is electrically connected to the second input port through a wire; the other terminal of the second resistor electrically connected to the second input port is electrically connected to one terminal of the second switch through a wire; and the other terminal of the second switch is grounded. This is a fourth technical feature of the present disclosure. An objective of the design "one terminal of a second resistor in the second logic level switch circuit is electrically connected to a power supply terminal through a wire, and the other terminal of the second resistor is electrically connected to the second input port through a wire; the other terminal of the second resistor electrically connected to the second input port is electrically connected to one terminal of the second switch through a wire; and the other terminal of the second switch is grounded" is as follows. The second logic level switch circuit is safe and reliable to use, has low production cost, and can reduce battery consumption (extend the battery life).
5. The second switch includes four connection points; for two connection points located at an outer end, one connection point is electrically connected to one terminal of the second resistor through a wire, and the other connection point is grounded through a wire; two connection points located in a middle position are electrically connected through a wire; and when two anti-theft ropes are provided in the device body, ends of the two anti-theft ropes are respectively electrically connected to the corresponding connection points, and the second switch is in the connected state. This is a fifth technical feature of the present disclosure. An objective of the design "the second switch includes four connection points; for two connection points located at an outer end, one connection point is electrically connected to one terminal of the second resistor through a wire, and the other connection point is grounded through a wire; two connection points located in a middle position are electrically connected through a wire; and when two anti-theft ropes are provided in the device body, ends of the two anti-theft ropes are respectively electrically connected to the corresponding connection points, and the second switch is in the connected state" is as follows. The second switch is versatile (it can be used for a rope-type anti-theft device with one anti-theft rope, as well as a rope-type anti-theft device with two anti-theft ropes).
6. The first switch serves as an unlocking switch in the device body. This is a sixth technical feature of the present disclosure. An objective of the design "the first switch serves as an unlocking switch in the device body" is as follows. The rope-type anti-theft device only needs to modify the wiring in the existing rope-type anti-theft device, rather than to modify the housing of the existing rope-type anti-theft device, greatly reducing the modification cost of the of the existing rope-type anti-theft device.

Technical Solution 1. A rope-type anti-theft device includes a device body, where a control module, a logic switch module and a power module are provided in the device body; the power module is configured to supply power to the control module; the logic switch module includes a second logic level switch circuit; the second logic level switch circuit is electrically connected to a second input port of a chip in the control module, and the second logic level switch circuit is provided with a second switch; when the second switch is in a connected state, the second input port is at a low level; when the second switch is in a disconnected state, the second input port is at a high level; and the second switch is connected or disconnected by an anti-theft rope in the device body.

Technical Solution 2. An alarm elimination method of a rope-type anti-theft device includes the following steps: when the rope-type anti-theft device is in an unlocked state and alarms due to cut-off of an anti-theft rope or breakage of a core of the anti-theft rope: disconnecting, by a button, a first switch if the first switch remains a connected state, such that the rope-type anti-theft device stops alarming; and connecting, by the button, the first switch if the first switch remains a disconnected state, such that the rope-type anti-theft device stops alarming; and when the rope-type anti-theft device is in a locked state and alarms due to cut-off of the anti-theft rope or breakage of the core of the anti-theft rope: disconnecting, by the button, the first switch if the first switch remains the connected state, such that the rope-type anti-theft device stops alarming; and connecting, by the button, the first switch if the first switch remains the disconnected state, such that the rope-type anti-theft device stops alarming.

Compared with the background art, the present disclosure has the following beneficial effects. 1. The rope-type anti-theft device can provide real-time protection for the article when the device is in a locked state, and detect any adverse situation in the anti-theft rope in a timely manner when the device is in an unlocked state. 2. A user can quickly and conveniently eliminate the alarm of the rope-type anti-theft device through the high and low level switching of the P65 port. 3. The logic switch module of the rope-type anti-theft device is safe and reliable to use, has low production cost, and can reduce battery consumption.

DETAILED DESCRIPTION OF THE EMBODIMENTS

Figure 1:
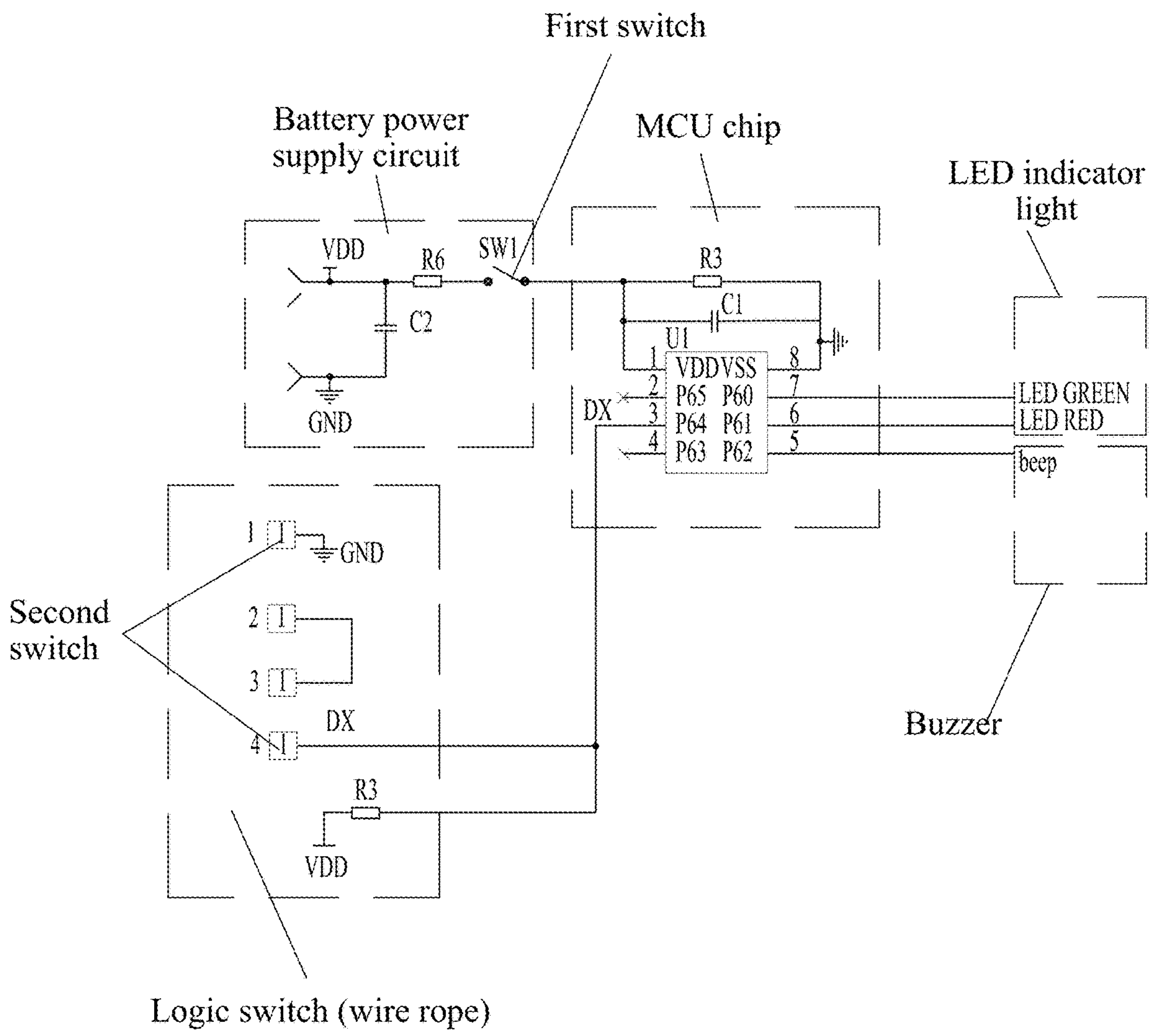
FIG. 1(Prior Art)
FIG. 1 is a circuit diagram of an existing rope-type anti-theft device.
Figure 2:
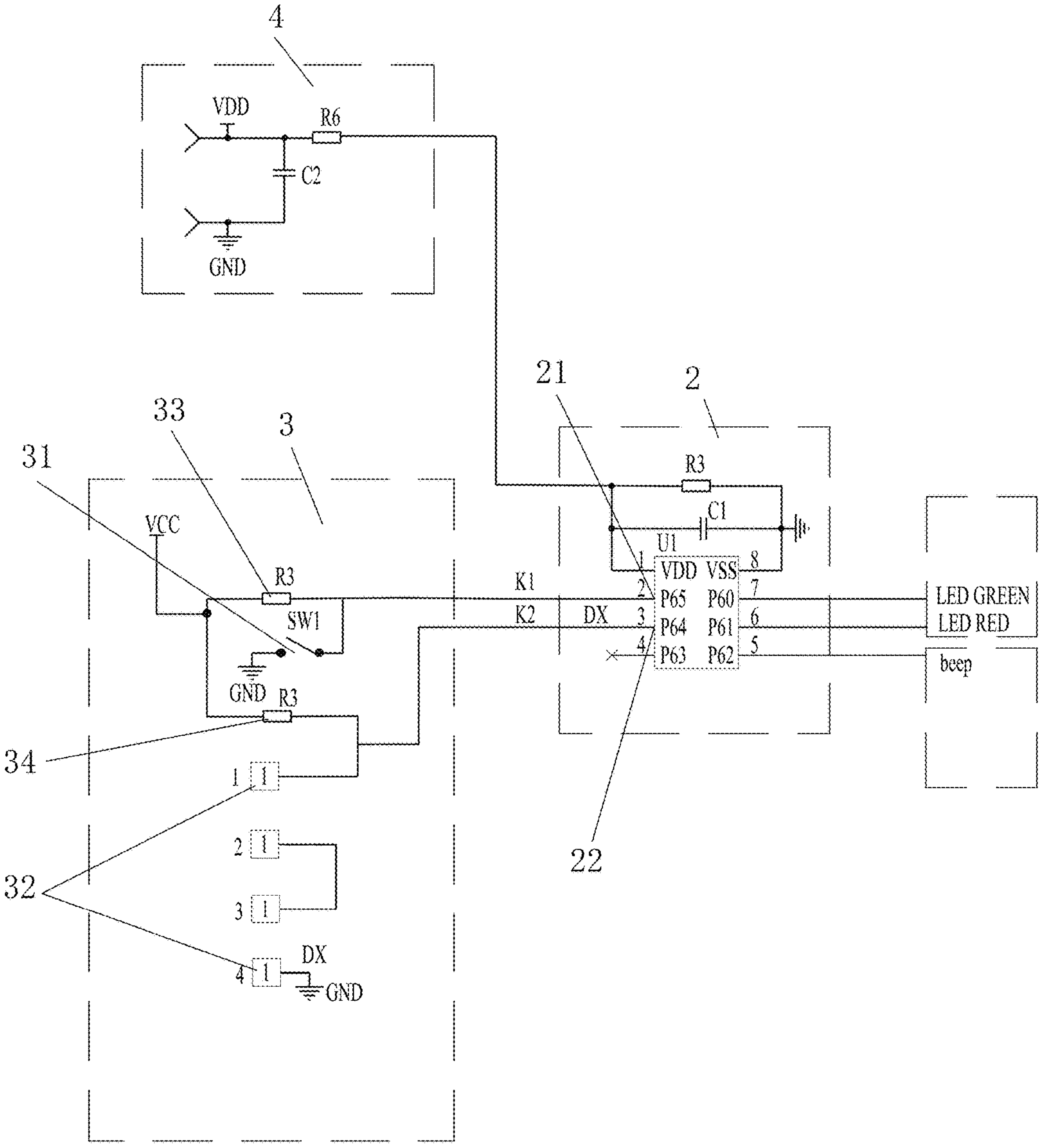
FIG. 2 is a circuit diagram of a rope-type anti-theft device.
Figure 3:
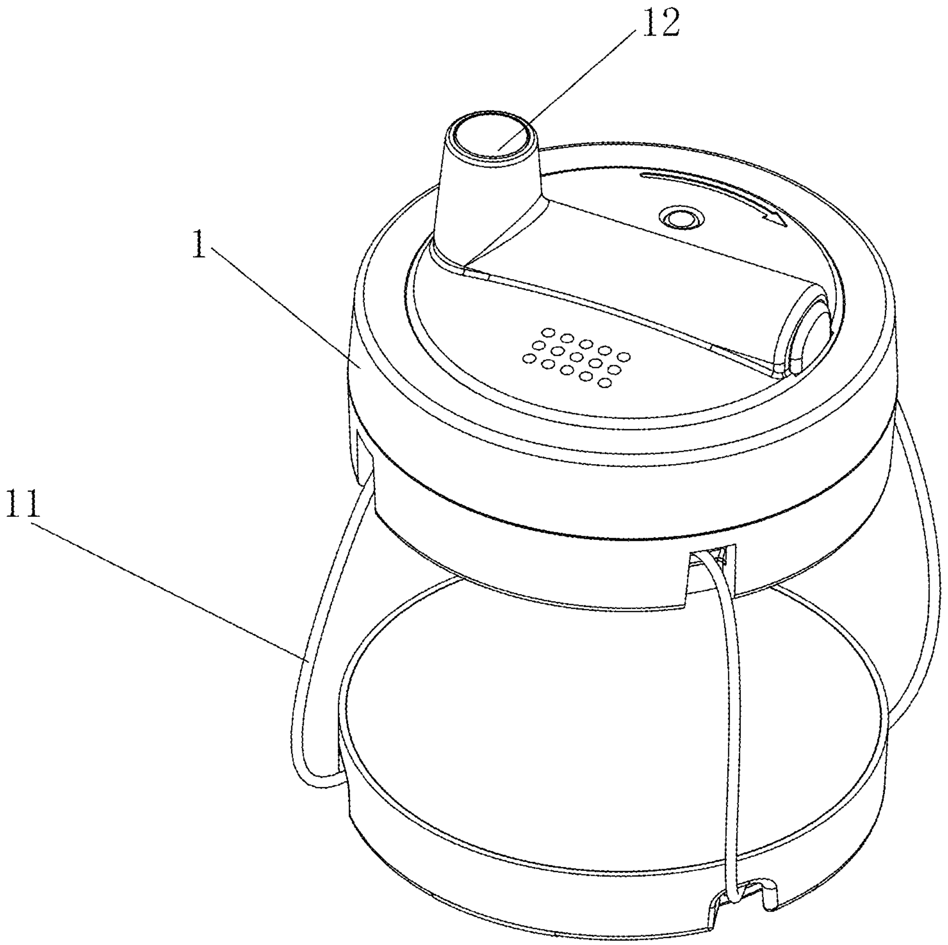
FIG. 3 is a structural diagram of a rope-type anti-theft device (with two anti-theft ropes).

Embodiment 1: Referring to FIGS. 2 and 3, a rope-type anti-theft device includes device body 1. Control module 2, logic switch module 3 and power module 4 are provided in the device body 1. The power module 4 is configured to supply power to the control module 2. The logic switch module 3 includes a first logic level switch circuit and a second logic level switch circuit. The first logic level switch circuit is electrically connected to first input port 21 of a chip in the control module 2, and the second logic level switch circuit is electrically connected to second input port 22 of the chip in the control module 2. The first logic level switch circuit is provided with first switch 31. When the first switch 31 is in a connected state, the first input port 21 is at a low level. When the first switch 31 is in a disconnected state, the first input port 21 is at a high level. The first switch 31 is connected or disconnected by a button located on a housing of the device body 1. The second logic level switch circuit is provided with second switch 32. When the second switch 32 is in a connected state, the second input port 22 is at a low level. When the second switch 32 is in a disconnected state, the second input port 22 is at a high level. The second switch 32 is connected or disconnected by anti-theft rope 11 of the device body 1. The chip is an MCU chip. The MCU chip serves as a core processor of the circuit, responsible for the operation and sleep of the tag (the rope-type anti-theft device).

The power module 4 includes a button battery. The button battery serves as a power supply for the rope-type anti-theft device and is located inside the device body 1. The button battery is electrically connected to the MCU chip in the control module 2 through a battery power supply circuit of the power module 4. A drain power voltage (VDD) port (pin 1) and a negative supply voltage (VSS) port (pin 8) of the MCU chip are electrically connected to the battery power supply circuit. An input voltage of the first logic level switch circuit can be provided by the button battery. The first input port 21 electrically connected to the first logic level switch circuit is a P65 port (pin 2) of the MCU chip. An input voltage of the second logic level switch circuit can be provided by the button battery. The second input port 22 electrically connected to the second logic level switch circuit is a P64 port (pin 3) of the MCU chip.

One terminal of first resistor 33 in the first logic level switch circuit is electrically connected to a power supply terminal through a wire, and the other terminal of the first resistor 33 is electrically connected to the first input port 21 through a wire. The other terminal of the first resistor 33 electrically connected to the first input port 21 is electrically connected to one terminal of the first switch 31 through a wire, and the other terminal of the first switch 31 is grounded. One terminal of second resistor 34 in the second logic level switch circuit is electrically connected to a power supply terminal through a wire, and the other terminal of the second resistor 34 is electrically connected to the second input port 22 through a wire. The other terminal of the second resistor 34 electrically connected to the second input port 22 is electrically connected to one terminal of the second switch 32 through a wire, and the other terminal of the second switch 32 is grounded.

The second switch 32 includes two connection points, where one connection point is electrically connected to one terminal of the second resistor 34 through a wire, and the other connection point is grounded through a wire. When only one anti-theft rope 11 is provided in the device body 1, two ends of the anti-theft rope 11 are respectively electrically connected to the two connection points, and the second switch 32 is in a connected state.

The first resistor 33 in the first logic level switch circuit and the second resistor 34 in the second logic level switch circuit have a same resistance value.

The first switch 31 serves as unlocking switch 12 in the device body 1. A light-emitting diode (LED) indicator light and a buzzer are provided in the device body 1. The control module 2 is configured to control the LED indicator light for a light prompt and the buzzer for a sound prompt. The LED indicator light is electrically connected to P60 port (pin 7) and P61 port (pin 6) of the MCU chip through an LED driving circuit (which is a prior art and will not be elaborated herein). The MCU chip controls a red light of the LED indicator light to turn on or off through the P61 port, while the MCU chip controls a green light of the LED indicator light to turn on or off through the P60 port. If the green light flashes, it indicates that the rope-type anti-theft device enters a protection state. If the red light flashes, it indicates that the rope-type anti-theft device is in an alarm state. The buzzer is electrically connected to P62 port (pin 5) of the MCU chip through a buzzer driving circuit (which is a prior art and will not be elaborated herein). The MCU chip controls the buzzer to sound an alarm through the P62 port.

When the rope-type anti-theft device is powered on (the battery begins to supply power to the device), whether the rope-type anti-theft device is in the unlocked or locked state, it can detect the continuity of the anti-theft rope. When an alarm is triggered due to cut-off of the anti-theft rope 11 or breakage of a core of the anti-theft rope 11, the alarm is eliminated by switching the high and low levels of the P65 port. That is, when the MCU chip receives high and low level switching information from the P65 port, the MCU chip controls the LED indicator light and/or the buzzer to stop warning.

Embodiment 2: On the basis of Embodiment 1, the second switch 32 includes four connection points. For two connection points located at an outer end, one connection point is electrically connected to one terminal of the second resistor 34 through a wire, and the other connection point is grounded through a wire. Two connection points located in a middle position are electrically connected through a wire. When two anti-theft ropes 11 are provided in the device body 1, ends of the two anti-theft ropes 11 are respectively electrically connected to the corresponding connection points, and the second switch 32 is in a connected state. The anti-theft rope 11 is affixed to an article. When the anti-theft rope 11 is cut off, the tag will trigger an alarm. As shown in FIG. 2, the four anti-theft rope connection points of the second switch 32 include point 1, point 2, point 3, and point 4. When there are two anti-theft ropes 11, one of the two ends of the anti-theft rope 11 is electrically connected to the point 1 and the point 2 respectively, while the two ends of the other anti-theft rope 11 are electrically connected to the point 3 and the point 4 respectively, and the second switch 32 in a connected state. When the anti-theft rope 11 is intact, the second switch 32 is connected, the P64 port is at a low level, and the MCU chip controls the rope-type anti-theft device to enter the protection state. When the anti-theft rope 11 is disconnected, the second switch 32 is disconnected, the P64 port is at a high level, the rope-type anti-theft device triggers an alarm, and the MCU chip controls the buzzer to sound an alarm.

Embodiment 3: On the basis of Embodiments 1 and 2, an alarm elimination method of the rope-type anti-theft device includes the following steps. When the rope-type anti-theft device is in the unlocked state and alarms due to cut-off of the anti-theft rope 11 or breakage of the core of the anti-theft rope 11 (the rope-type anti-theft device is in the unlocked state and the second switch 32 is disconnected), the following operations are performed.

If the first switch 32 remains the connected state (the P65 port is at low level), the first switch 32 is disconnected (the P65 port is switched to a high level) through a button, and the rope-type anti-theft device stops alarming.

If the first switch 32 remains the disconnected state (the P65 port is at a high level), the first switch 32 is connected (the P65 port is switched to a low level) through the button, and the rope-type anti-theft device stops alarming.

When the rope-type anti-theft device is in the locked state and alarms due to cut-off of the anti-theft rope 11 or breakage of the core of the anti-theft rope 11 (the rope-type anti-theft device is in the locked state and the second switch 32 is disconnected), the following operations are performed.

If the first switch 32 remains the connected state (the P65 port is at low level), the first switch 32 is disconnected (the P65 port is switched to a high level) through a button, and the rope-type anti-theft device stops alarming.

If the first switch 32 remains the disconnected state (the P65 port is at a high level), the first switch 32 is connected (the P65 port is switched to a low level) through the button, and the rope-type anti-theft device stops alarming.

It should not understood that detailed text descriptions of the design idea of the present disclosure are made in the above embodiments, but these text descriptions just briefly illustrates, but not limits, the design idea of the disclosure, and any combination, addition, or modification without departing from the idea of the disclosure should fall within the protection scope of the present disclosure.

What is claimed is:

1. A rope-type anti-theft device, comprising:

a device body, wherein a control module, a logic switch module, and a power module are provided in the device body;

the power module is configured to supply power to the control module;

the logic switch module comprises a first logic level switch circuit and a second logic level switch circuit;

the first logic level switch circuit is electrically connected to a first input port of the chip in the control module, and the first logic level switch circuit is provided with a first switch; when the first switch is in a connected state, the first input port is at a low level; when the first switch is in a disconnected state, the first input port is at a high level; and the first switch is connected or disconnected by a button located on a housing of the device body; wherein the first switch serves as an unlocking switch in the device body; and is in the disconnected state when the rope-type anti-theft device is in an unlocked state;

the second logic level switch circuit is electrically connected to a second input port of a chip in the control module, and the second logic level switch circuit is provided with a second switch; when the second switch is in a connected state, the second input port is at a low level; when the second switch is in a disconnected state, the second input port is at a high level; and the second switch is connected or disconnected by an anti-theft rope in the device body, causing an alarm to be set off by the anti-theft rope being cut in a unlocked state of the rope-type anti-theft device.

2. The rope-type anti-theft device according to claim 1, wherein a first terminal of a first resistor in the first logic level switch circuit is electrically connected to a power supply terminal through a first wire, and a second terminal of the first resistor is electrically connected to the first input port through a second wire; the second terminal of the first resistor electrically connected to the first input port is electrically connected to a first terminal of the first switch through a third wire; and a second terminal of the first switch is grounded.

3. The rope-type anti-theft device according to claim 1, wherein a first terminal of a second resistor in the second logic level switch circuit is electrically connected to a power supply terminal through a first wire, and a second terminal of the second resistor is electrically connected to the second input port through a second wire; second terminal of the second resistor electrically connected to the second input port is electrically connected to a first terminal of the second switch through a third wire; and a second terminal of the second switch is grounded.

4. The rope-type anti-theft device according to claim 3, wherein the second switch comprises a first connection point and a second connection point; the first connection point is electrically connected to the second terminal of the second resistor through a fourth wire, and the second connection point is grounded through a fifth wire; and when only one anti-theft rope is provided in the device body, two ends of the anti-theft rope are respectively electrically connected to the first connection point and the second connection point, and the second switch is in the connected state.

5. The rope-type anti-theft device according to claim 3, wherein the second switch comprises a first connection point, a second connection point, a third connection point and a fourth connection point; for the first connection point and the fourth connection point located at an outer end, the first connection point is electrically connected to the second terminal of the second resistor through a fourth wire, and the fourth connection point is grounded through a fifth wire; the second connection point and the third connection point located in a middle position are electrically connected through a sixth wire; and when a first anti-theft rope and a second anti-theft rope are provided in the device body, ends of the first anti-theft rope are respectively electrically connected to the first connection point and the second connection point, ends of the second anti-theft rope are respectively electrically connected to the third connection point and the fourth connection point, and the second switch is in the connected state.

6. The rope-type anti-theft device according to claim 1, wherein the first resistor in the first logic level switch circuit and the second resistor in the second logic level switch circuit have a same resistance value.

7. The rope-type anti-theft device according to claim 1, wherein a light-emitting diode (LED) indicator light and a buzzer are provided in the device body; and the control module is configured to control the LED indicator light for a light prompt and the buzzer for a sound prompt.

8. An alarm elimination method of the rope-type anti-theft device according to claim 1, comprising the following steps:

disconnecting, by the button, the first switch if the first switch remains the connected state, such that the rope-type anti-theft device stops alarming; and connecting, by the button, the first switch if the first switch remains the disconnected state, such that the rope-type anti-theft device stops alarming.

* * * * *